United States Patent [19]

Call et al.

[11] Patent Number: 4,891,751

[45] Date of Patent: Jan. 2, 1990

[54] MASSIVELY PARALLEL VECTOR PROCESSING COMPUTER

[75] Inventors: Duane B. Call, Provo; Alfred Mudrow; Randall C. Johnson, both of Orem; Robert F. Bennion, Provo, all of Utah

[73] Assignee: Floating Point Systems, Inc., Beaverton, Oreg.

[21] Appl. No.: 31,697

[22] Filed: Mar. 27, 1987

[51] Int. Cl.[4] .................. G06F 15/16; G06F 13/00
[52] U.S. Cl. ................................................ 364/200
[58] Field of Search ... 364/200 MS File, 900 MS File

[56] References Cited

U.S. PATENT DOCUMENTS

| | | | |
|---|---|---|---|
| 4,065,808 | 12/1977 | Schomberg et al. | 364/200 |
| 4,498,133 | 2/1985 | Bolton et al. | 364/200 |
| 4,507,726 | 3/1985 | Grinberg et al. | 364/200 |
| 4,543,642 | 9/1985 | Hansen | 364/900 |
| 4,636,942 | 1/1987 | Chen et al. | 364/200 |
| 4,720,780 | 1/1988 | Dolecek | 340/825.05 |
| 4,727,474 | 2/1988 | Batcher | 364/200 |
| 4,739,474 | 4/1988 | Hotsztynski | 364/200 |
| 4,739,476 | 4/1988 | Fiduccia | 364/200 |
| 4,766,534 | 8/1988 | De Benedictis | 364/200 |

OTHER PUBLICATIONS

John P. Hayes, "A Microprocessor-based Hypercube Supercomputer", IEEE Micro, Oct. 1986, pp. 6-17.
Robert Rosenberg, "Super Cube", Electronics Week, Feb./85, pp. 15-17.
Paul Wiley, "A parallel architecture comes of age at last", IEEE Spectrum, Jun. 87, pp. 46-50.
Ray Asbury, "Concurrent Computers Ideal for Inherently Parallel Problems", Computer Design, Sep./85, pp. 99-107.
Wesley R. Iversen, "New CMOS Chip Processes Data in Parallel", Electronics Week, Nov./84, pp. 17-18.
Azriel Rosenfeld, "Parallel Image Processing Using Cellular Arrays", IEEE Computer, Jan./83, pp. 14-20.

Primary Examiner—Andrew J. James
Assistant Examiner—Viet Nguyen
Attorney, Agent, or Firm—Dellett, Smith-Hill & Bedell

[57] ABSTRACT

A massively parallel vector computer comprises a set of vector processing nodes, each node including a main processor for controlling access to a random access memory through an internal bus and a set of ports for interfacing external busses to the internal bus. The external busses interconnect pairs of nodes to form a network through which data may be transmitted from the random access memory in any one node to the random access memory in any other node in the network. Each vector processing node also includes a vector memory accessed through a local bus, the local and internal busses communicating via an additional port controlled by the main processor. A vector processor within each node performs operations on vectors stored in the vector memory and stores the results in the vector memory. A peripheral processing network comprises a set of peripheral processing nodes interconnected via further busses, and wherein selected peripheral processing nodes are coupled to selected vector processing nodes. The peripheral processing nodes are adapted to transmit data to and receive data from peripheral devices.

13 Claims, 5 Drawing Sheets

FIG. 7

MASSIVELY PARALLEL VECTOR PROCESSING COMPUTER

BACKGROUND OF THE INVENTION

The present invention relates in general to parallel processing systems and in particular to a massively parallel vector processing computer.

Scientific data processing applications often involve large numbers of relatively simple arithmetic operations, but for many such applications the computing time required for a single processor to perform all operations is prohibitively long. Fortunately, large scientific data processing applications can often be partitioned so that they may be carried out by several concurrently operating (parallel) processors, each of which handles a different portion of the problem so as to reduce the total required processing time. However, in the course of carrying out these operations, it is often necessary for individual processors to transmit data to one another and also to access shared memory, and the data transmission time can add significantly to the overall data processing time.

Data transmission time is minimized when there are direct communication paths (e.g. busses) between all processing and shared memory devices in a parallel processing system. But when large numbers of parallel processors are needed, it is impractical to provide separate busses to interconnect each processor with every other processor and every shared memory in the system. To reduce the number of interconnections required, individual processors and memory devices can be interconnected to form networks consisting of a set of "nodes" coupled by busses. Each node comprises a processor and/or shared memory devices along with a set of ports for transferring data over busses (links) connecting the node to other nodes in the system. While only "adjacent" nodes, i.e., those directly interconnected by a bus, have direct access to one another, data may be transferred between "non-adjacent" nodes by means of routing data from node to node.

Nodes in a ring network are interconnected in a loop, each node having one incoming bus and one outgoing bus, wherein data is transferred from node to node around the loop until it reaches its proper destination. When nodes have several unidirectional or bidirectional ports, each node may be directly connected by busses to several other nodes to form multi-dimensional networks including, for example, two-dimensional "mesh" networks, and three-dimensional "cubic" networks. Multi-dimensional networks typically require more complicated data routing structures within each node than nodes in one-dimensional networks, but permit alternative communication paths and generally shorter routing distances between nodes.

FIG. 1 illustrates a node of the prior art which may be employed in groups to form a massively parallel multi-dimensional network. The node may suitably comprise an Inmos model T414 "transputer" 2, including a main processor 6, a random access memory (RAM) 8, a set of four external bus interface ports 10, and a local bus interface port 12, all connected to an internal bus 4. The external bus interface ports 10 provide for communication between the internal bus 4 and four external busses 14 (links) to other nodes of the network, and the local interface bus port 12 provides for communication between the internal bus 4 and a local bus 16. Optional peripheral data storage devices such as additional RAM 18 or a hard disk 20 can be accessed through the local bus 16.

Data transmitted into a node via a link 14 may be stored in RAM 8 or 18. This data may then be transferred outward on another link 14 to another node, or may provide input to the processor 6 which can be programmed to carry out data processing operations according to instructions also stored in RAM 8. The results of such processing operation may be stored in RAM 8 for subsequent transfer to another node over one of the links. Peripheral devices such as disk 20 nd additional RAM 18 accessed through local bus 16 are suitably utilized for storing additional program instructions and data.

Such a node may be utilized to form many types of networks depending on how the nodes are interconnected via links 14. One such network comprises a multi-dimensional "hypercube" network, a portion of which may be configured as illustrated in block diagram form in FIG. 2 wherein each node 26 is represented by a small cube. Eight nodes 26 are illustrated as interconnected by way of links 14 (represented as solid lines) to form a cubic module 22, and another eight nodes 26 are similarly interconnected by links to form another cubic module 24. Modules 22 and 24 are in turn related by intermodular links 14 (depicted by dashed lines) extending between selected nodes of module 22 and selected nodes of module 24. While only two modules 22 and 24 are shown in FIG. 2, many such modules may be included in a particular network, and modules may be interconnected by more than four links. This type of three-dimensional network architecture permits easy system expansion and helps minimize the distance (i.e., the number of nodes) through which data must travel between any two nodes.

In networks utilizing the node of FIG. 1, performance is limited by the competing demands for access to RAM 8. For example, in the hypercube network of FIG. 2, when the nodes of module 22 must communicate with the nodes of module 24, data passes through the adjacent nodes which link the two modules. Processors 6 in these nodes must then compete with links 14 for access to RAM 8 therein and may often have to wait to access memory. The competition for RAM 8 access degrades the rate at which the processors 6 can process data. In addition, when large blocks of data stored in a disk 20 or additional RAM 18 of one node must be transferred to another node, the resulting heavy data traffic on the internal bus 4 can also impede computational duties of the processors 6. Thus, data transmission within the network can reduce the average rate at which the processors can carry out data processing operations.

Many large scale scientific applications involve large numbers of vector operations. (A vector is a sequence of data, and a vector operation is an arithmetic operation utilizing one or more vectors as arguments and producing a new vector as a result.) Typically, input vectors are initially stored in one or more disk drives 20 or RAMs 18 connected to the local busses of selected nodes in a network. Various processors in the system then acquire the vectors and perform operations to produce output vectors which may be transmitted to other nodes for further operations. However, processors 6 are usually general purpose processors which are not necessarily adapted to perform vector operations rapidly, and are frequently interrupted in order to handle data traffic through the node as hereinbefore mentioned.

What is needed is a multi-processor computer which can rapidly carry out simultaneous vector operations, and wherein vectors may be transferred between commonly accessible data storage peripheral devices without substantially reducing the rate at which each processor functions.

SUMMARY OF THE INVENTION

In accordance with one aspect of the present invention, a massively parallel vector computer comprises a set of vector processing nodes, each including a main processor and a main random access memory (RAM) connected to an internal bus. Each node also includes a vector memory and a programmable vector processor connected to a local bus, the local and internal busses communicating via a local interface port controlled by the main processor. A set of external interface ports selectively interfaces a plurality of separate external busses (links) to the internal bus. The links interconnect pairs of nodes to form a vector processing network in which data may be transferred from any node to any other node in the network via the interconnecting nodes and links.

The vector processor of each node in the vector processing network may be programmed to perform various operations on vectors (data sequences) stored at successive addresses in the vector memory. The vector memory suitably comprises two banks of dual port random access memory, each bank having one port providing read/write access via the local bus of the node and a second port providing high-speed read/write access to the vector processor. When vectors are transferred to a node over one of the links, the vector is stored in the vector memory. Individual elements (data words) of a vector stored in the vector memory may be changed or rearranged as necessary by the main processor which can randomly access individual storage locations in the vector memory through the local bus. Thereafter, the vector processor carries out predetermined vector operations on vectors stored in the two vector memory banks, the results of the vector operations being stored as vectors. When the vector operations are complete, vectors stored in the vector memory may be transferred for further processing to another node in the network by way of interconnecting nodes and links.

Since the vector processor can access vectors in the vector memory without utilizing the internal bus of the node, the vector processor can undertake vector operations at the same time that the node's internal bus is utilized to convey other vectors, instructions or other information between the main RAM, external links and the main processor. Thus, a vector processor in a particular node can carry out vector operations at the same time that the node is engaged in communicating with another node, or at the same time that the main processor is performing computations or other operations involving access to the main memory. Therefore, even though a vector processing node may, for example, be assisting in data transfer between two other nodes in the network, data transfer does not substantially affect the rate at which the vector processing node performs vector operations.

According to another aspect of the invention, the vector computer further comprises a set of peripheral processing nodes, each including a main processor, a main RAM, a set of external bus interface ports, and a local bus interface port, all connected to an internal bus. Each external bus interface port interfaces a link to the internal bus, and the local bus interface port interfaces a local bus to the internal bus. One port of a dual port RAM is accessed via the local bus, while the second port of the RAM is accessed by a direct memory access (DMA) controller which provides data transfer between the RAM and a secondary memory device, suitably a hard disk drive.

The external bus interface ports of each peripheral processing node link that node to other peripheral processing nodes to form a peripheral processing network in which data may be transferred from any one peripheral processing node to any other node via interconnecting peripheral processing nodes and links. External bus interface ports of one or more of the peripheral processing nodes are also interconnected by links to vector processing nodes in the vector processing network such that each vector processing node in the vector processing network may communicate with any one of the peripheral processing nodes in the peripheral processing network via intermediate links and nodes.

Since the peripheral processing nodes are interconnected into a peripheral processing network including only peripheral processing nodes, data may be transferred between secondary storage devices of different peripheral processing nodes without passing through any intervening vector processing nodes. Conversely, since all of the vector processing nodes are connected into a vector processing network including only vector processing nodes, data may be transferred between vector processing nodes without passing through any intervening peripheral processing nodes. Although any vector processing node can communicate with any peripheral processing node via internetwork links, large blocks of data may be transferred between peripheral processing nodes without interfering with data transfer and vector processing operations carried out by the vector processors.

It is accordingly an object of the invention to provide an improved vector computer capable of simultaneously performing multiple vector operations.

It is another object of the invention to provide an improved vector computer, including multiple processors and secondary memory devices, interconnected for parallel operation and rapid intercommunication.

The subject matter of the present invention is particularly pointed out and distinctly claimed in the concluding portion of this specification. However, both the organization and method of operation of the invention, together with further advantages and objects thereof, may best be understood by reference to the following description taken in connection with accompanying drawings wherein like reference characters refer to like elements.

DRAWINGS

FIG. 7 is a detailed block diagram of a vector processing node in accordance with the present invention.

DETAILED DESCRIPTION

The present invention relates to a massively parallel vector processing computer comprising a "vector processing" network of "vector processing nodes" and a "peripheral processing" network of "peripheral processing nodes". Each vector processing node is adapted to store data and to transmit and receive data to or from other nodes in the vector processing network by way of interconnecting busses (links). Each vector processing node includes processors for independently performing computations utilizing the data stored in the node. Each peripheral processing node includes a secondary storage device, such as a hard disk drive, and is adapted to transmit and receive data to or from other nodes in the peripheral processing network via interconnecting links. Various nodes of the vector processing network are connected by links to nodes of the peripheral processing network so that the vector processing nodes can transmit data to the peripheral processing nodes for storage in the secondary storage devices therein and can also receive data obtained from the secondary storage devices.

Figure 3:
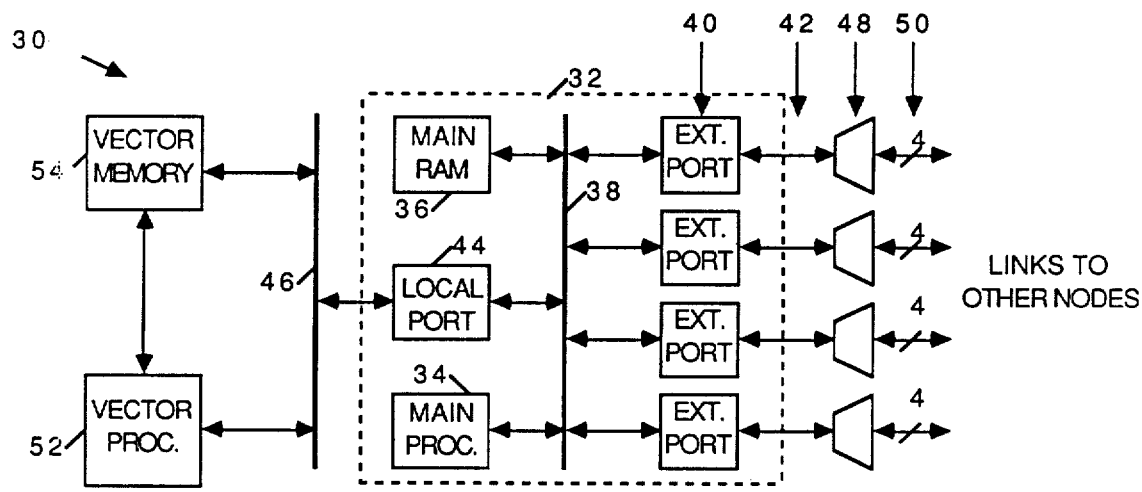
FIG. 3 is a block diagram of a vector processing node in accordance with the present invention.

Each vector processing node 30, depicted in block diagram form in FIG. 3, suitably includes an Inmos model T414 "transputer" 32, comprising a main processor 34 and a random access memory (RAM) 36 connected to a local bus 38. The transputer 32 further includes a set of four ports 40, each interfacing a separate external bus 42 to internal bus 38, and a port 44 for interfacing a local bus 46 to the internal bus 38. Each node 30 is provided with a set of four bi-directional multiplexers 48, each for connecting a selected one of four bi-directional network busses (links) 50 to one of the aforementioned external busses 42, wherein links 50 provide paths for transmitting data to and receiving data from another node in the network. Each vector processing node 30 includes a vector processor 52 and a dual port random access "vector" memory 54. The vector processor 52 and one port of vector memory 54 are connected to the local bus 46 while a second port of vector memory 54 provides direct high speed read/write access to the vector processor 52.

Figure 4:
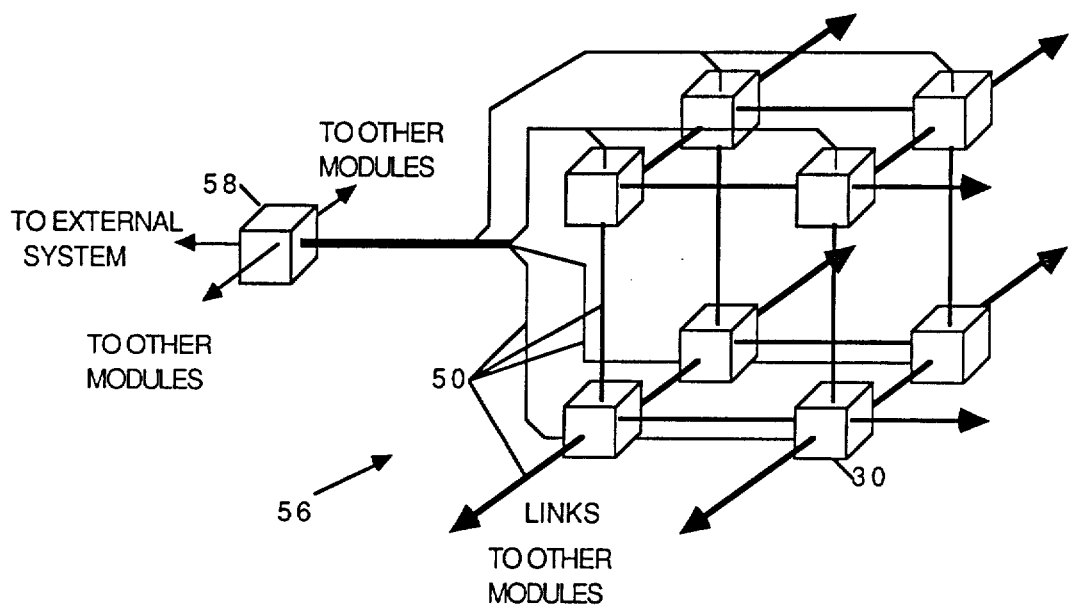
FIG. 4 is a block diagram of a module of a multiple processing network according to the present invention.

FIG. 4 depicts in block diagram form a cubic vector processing "module" 56 of vector processing nodes wherein each of a set of eight vector processing nodes 30 comprises a separate "corner" of the module. Each corner node is connected via links 50 to three other vector processing nodes and each node of module 56 is additionally connected via a separate link 50 to a "system" node 58, described in detail hereinbelow. A vector processing network may include one or more vector processing modules 56, wherein various vector processing nodes of the different modules are further interconnected by additional links 50.

Still referring to FIGS. 3 and 4, data may be transferred from node to node within a module or between two modules via interconnecting links 50. Data initially stored in the RAM 36 in one node 30 can be read out of RAM 36 and transferred to an outgoing link 50 via internal bus 38 and the appropriate port 40, external bus 42, and multiplexer 48. Conversely, incoming data on a link 50 may be transmitted through a multiplexer 48, an external bus 42, and an external port 40 to internal bus 38 for storage in RAM 36. When data transmitting and receiving nodes are not directly interconnected by a link, the data may be routed through intermediate nodes and links, the data suitably being temporarily stored in RAM 36 of intermediate nodes between receipt and subsequent retransmission. Data may also be transferred from RAM 36 to vector memory 54 via the internal bus 38, local port 44, and local bus 46.

The main processor 34, which controls internal bus 38, ports 40 and 44, and multiplexers 48 of a node, has read and write access to RAM 36 as well as read and write access to vector memory 54, and may be programmed to carry out various computations on data located in these memories Program instructions for main processor 34 are stored in RAM 36, and may also be stored in vector memory 54 when necessary. The vector processor 52 is programmed to carry out various operations on vectors (data sequences) stored in vector memory 54, with the results being stored in the vector memory. Program instructions are transmitted to the vector processor 52 via local bus 46.

Many large scale scientific applications involve large numbers of vector operations, for example, addition, subtraction or multiplication of vectors. In many cases vector operations can be allocated among several vector processors 52 so the operations can be performed simultaneously, thereby reducing the processing time required. Furthermore, large scale scientific applications may involve large numbers of "non-vector" data processing operations, such as, for example, performance of calculations which operate on or produce individual datum rather than vectors. Each main processor 34 can be programmed to carry out such non-vector data processing operations while also controlling routing of data through the vector processing node 30. The main processor 34 is capable of accessing and modifying individual elements within vectors stored in the vector memory 54 in preparation for vector operations performed by vector processor 52.

The architecture of a node 30 permits vector processor 52 to carry out vector operations at the same time main processor 34 is performing other operations, e.g., transferring data between RAM 36 and any of the links 50 or performing calculations on data stored in RAM. Thus, once vectors are stored in vector memory 54, the speed with which node 30 carries out vector operations on these vectors is substantially independent of any data traffic being handled by the node, and substantially independent of computational or other functions conducted by the main processor 34.

Figure 1:
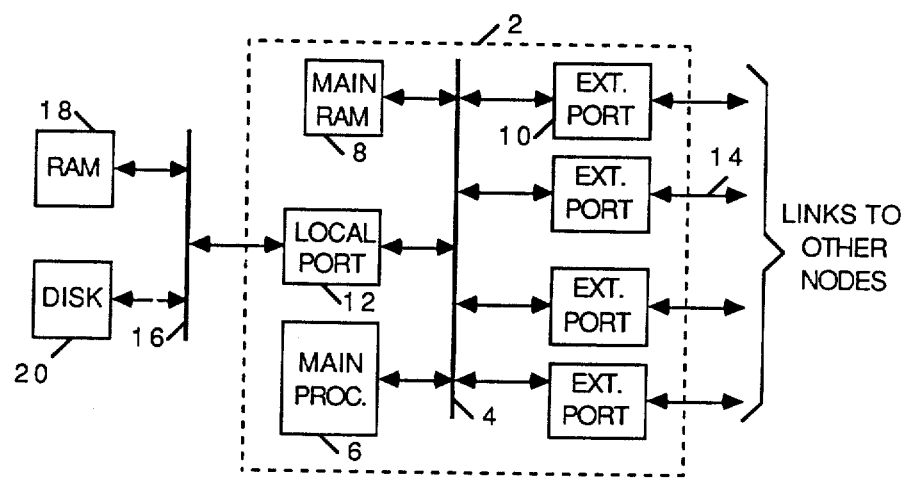
FIG. 1 is a block diagram of a node in a multiple, processing network of the prior art.
Figure 2:
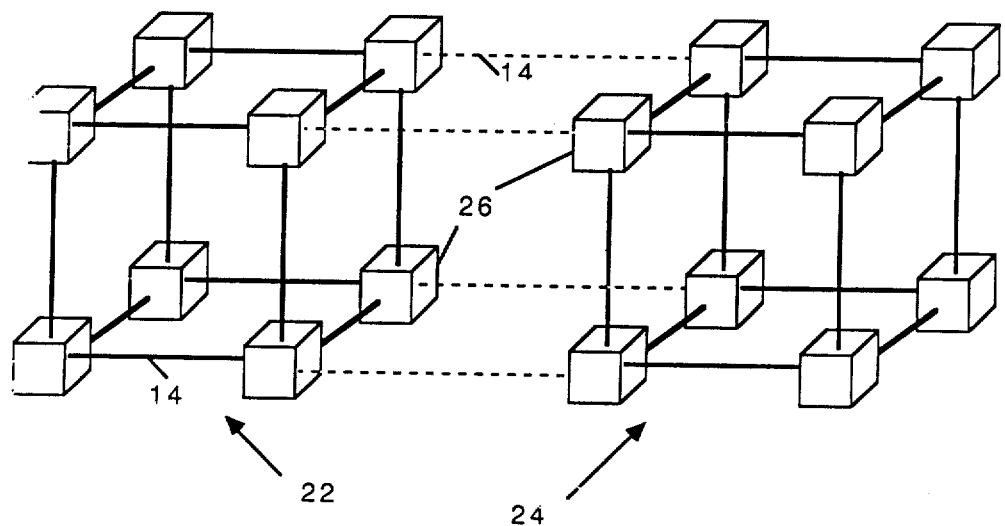
FIG. 2 is a block diagram of a portion of a multiple processing network of the prior art.
Figure 5:
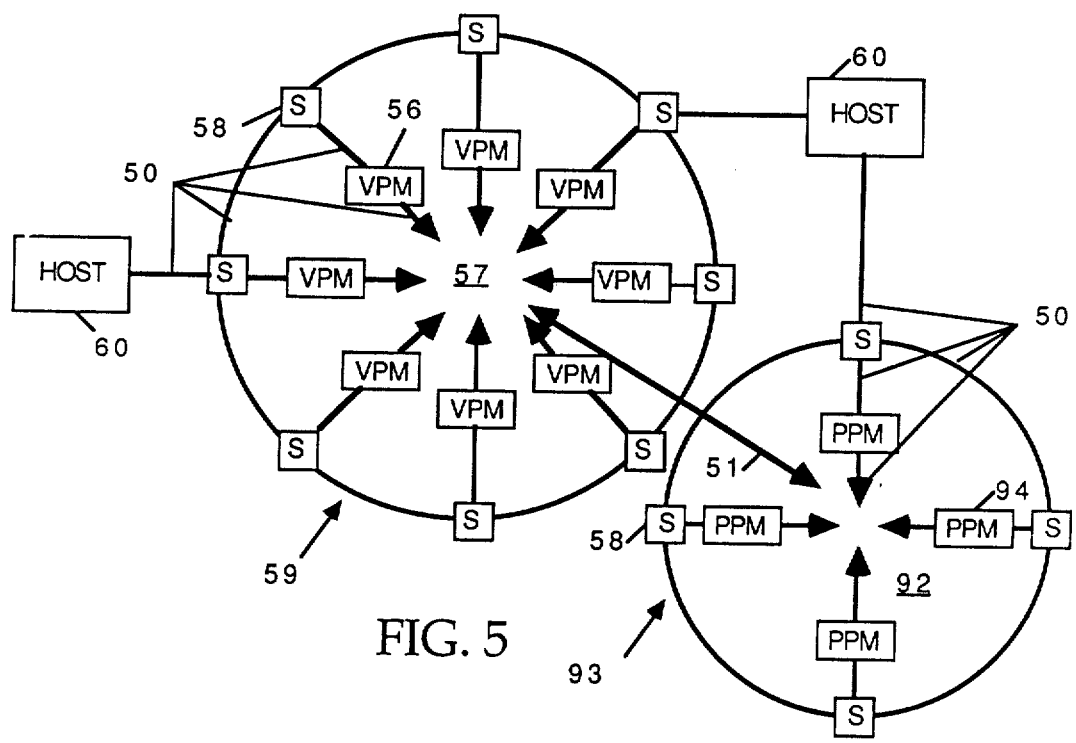
FIG. 5 is a block diagram of a multiple processing network in accordance with the present invention.

FIG. 5 is a block diagram of a parallel processing computer according to the present invention including a set of eight vector processing modules (VPM) 56 interconnected by intermodular links 50 to form a vector processing network 57. A system node (S) 58 is provided for each vector processing module 56, each vector processing node for each vector processing module 56 being connected to the system node by a common link 50 (see also FIG. 4). The system nodes 58 are themselves interconnected by links 50 to form a loop type "system network" 59 in the form of a ring "surrounding" the vector processing network 57. Each system node 58 may be connected to a host computer 60 via a link 50, two such host computers 60 being shown in FIG. 5. The system network 59 provides interfacing between host computers 60 and the vector processing network 57 for purposes of supplying programming instructions and input data to vector processing nodes within each module, and for receiving output data produced by the vector processing network. The inwardly directed arrows in the drawing representation of vector processing network 57 indicate network interconnections between the vector processing modules of the type generally depicted by dashed lines in FIG. 2. Thus the eight vector processing modules of FIG. 5 may themselves be intercoupled in a three-dimensional cubic configuration, i.e., continuing and extending the same structural relationship as depicted within the various vector processing modules. Of course, various other interconnection configurations are possible.

Figure 6:
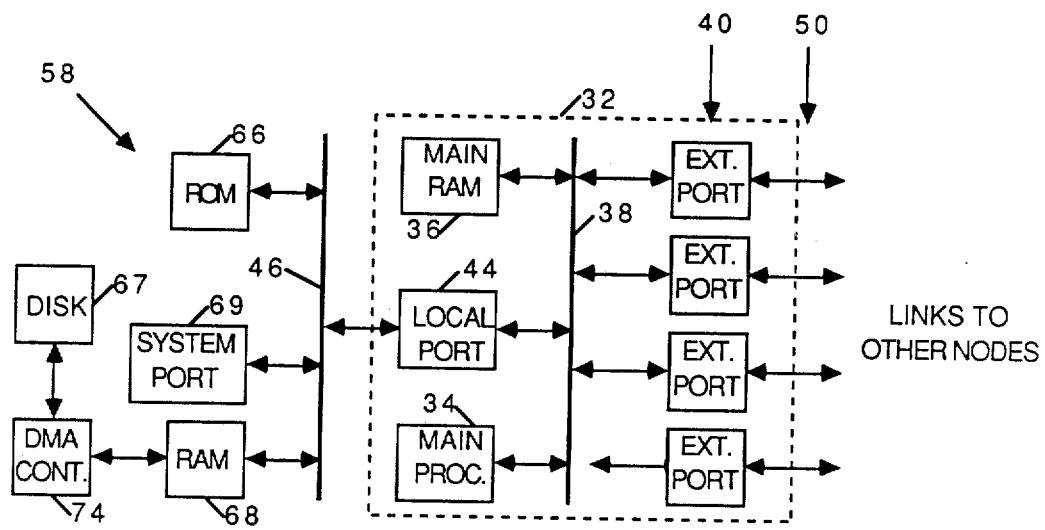
FIG. 6 is a block diagram of a system node of a multiple processing network in accordance with the present invention.

FIG. 6 is a block diagram of a system node 58. System node 58 is similar in topology to the vector processing node 56 of FIG. 3 in that it suitably includes an Inmos model T414 transputer having a RAM 36, a local bus interface port 44, main processor 34 and four external bus interface ports 40 each connecting one of four links 50 to an internal bus 38. However, the system node 58 is not provided with a vector processor or a vector memory, but instead includes read only memory 66, a dual port random access memory 68, and a "system port" 69 connected to its local bus 46. In addition, a direct memory access (DMA) controller 74 can interface a secondary memory device suitably comprising a hard disk 67 to the second port of RAM 68. The system nodes communicate with other nodes via links 50 in much the same way that vector processing nodes communicate with one another. In addition, as hereinbefore mentioned, system nodes provide interface between the vector computer and a host computer so that the host computer can provide programming instructions and input data to the vector computer and receive output data from the vector computer. The hard disk drive 67 may be utilized for interim storage of programming information and input/output data. Disk drive 67 can also be employed to periodically store data representing the current state of the system, including the contents of all of the main RAMS and vector memories in the vector processing nodes, so that when and if a system error occurs system operation may be restored to a prior state.

In many applications, the extent of instructions, vectors and other data required is too large to be conveniently stored in the RAM 36 and/or vector memory 54 of the vector processing nodes of FIG. 3, and it is therefore advantageous to provide the vector processing nodes with further access to one or more disk drives capable of storing large blocks of instructions and data. Disk drives could be interfaced to the local busses 46 of various vector processing nodes 30 to provide additional data storage. However, when vectors or other large blocks of data must frequently be transferred between secondary storage devices accessed through different vector processing nodes, the transfer can tie up the internal busses 38 in all the intervening nodes and can therefore degrade processing performance in the intervening nodes.

In accordance with the present invention, a set of "peripheral processing nodes" is also provided, one for each of a plurality of hard disks or other secondary memory means to be included in the system. Each peripheral processing node is generally similar in topology to the system node 58, as shown in FIG. 6, except that peripheral processing nodes do not have a system port 69 connected to their local busses 46. Each peripheral processing node provides access to a secondary memory (e.g. hard disk 67) via links 50 to other nodes in the system. The disk drives in the peripheral processing nodes are primarily utilized for temporary storage of vectors and other data generated or utilized by the vector processing nodes in the course of carrying out data processing applications.

Peripheral processing nodes may be arranged in cubic modules consisting of eight peripheral processing nodes and associated system nodes in the manner the vector processing nodes 30 are interconnected to form vector processing modules 56 as shown in FIG. 4. In the preferred embodiment of the invention, all of the peripheral processing modules of the system are intercoupled by links to form a peripheral network in which data may be transferred from any one peripheral processing node to any other peripheral processing node via intermediate nodes and links. One or more of the peripheral processing nodes are interconnected by links to various of the vector processing nodes in the vector processing network, such that each vector processing node in the vector processing network may communicate with any one of the peripheral processing nodes in the peripheral processing network via intermediate links and nodes. Generally a plurality of the last mentioned links are provided.

Thus, in addition to a vector processing network 57, FIG. 5 also illustrates a peripheral processing network 92 comprising four peripheral processing modules (PPM) 94. These modules can be interconnected in the manner indicated by dashed lines in FIG. 2, but in two directions. Of course, other interconnection network configurations are also possible.

A system node 58 is provided for each peripheral processing module 94 and is connected to each peripheral processing node in the module by a separate link 50. Selected nodes within modules in the peripheral processing network 92 are further connected to nodes within the vector processing network 57 via network links such as link 51. System nodes 58 associated with the peripheral processing network 92 are interconnected by links to form a loop-type system network 93, accessed, for example, at one system node 58 by host computer 60.

It will be noted that varying numbers of vector and peripheral processing nodes and their associated system nodes can be interconnected in different ways due to the large number of links available to each node. However, it is advantageous to interconnect vector and peripheral processing node in distinct or separate vector and peripheral processing networks. Since the peripheral processing nodes are interconnected in a peripheral processing network including only peripheral processing nodes, large blocks of data may be transferred between peripheral devices such as disk drives connected to local busses of each peripheral processing node without passing through intervening vector processing nodes and interfering with processing operations. One particular advantage of the system topology is in permitting a host computer to move blocks of input data into and between peripheral storage nodes in preparation for executing a new application without impeding data transfers occurring between vector processing nodes currently executing another application.

Figure 7:
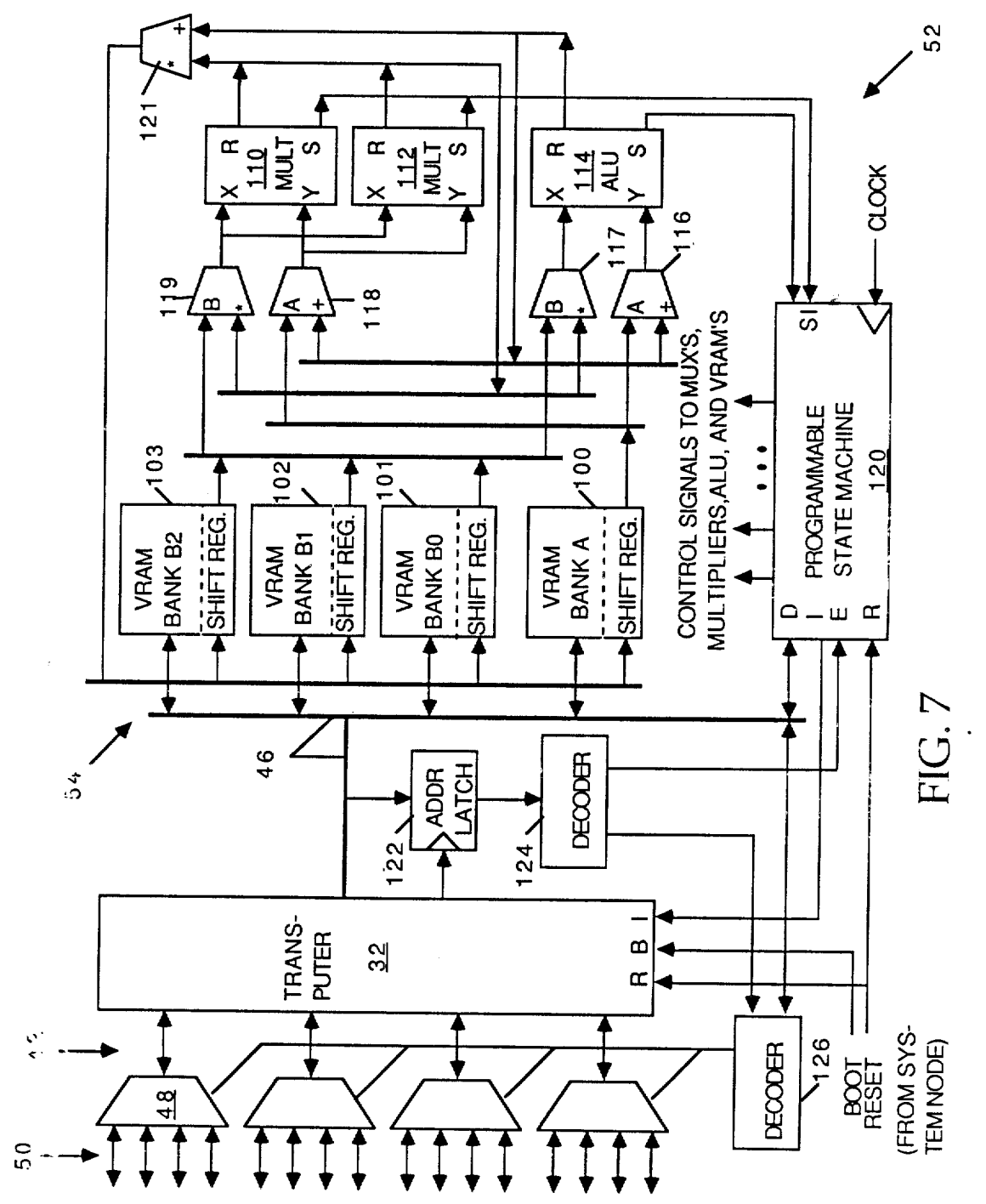

FIG. 7 depicts the vector processing node 30 of FIG. 3 in more complete block diagram form, the vector processor 52 and vector memory 54 being shown in greater detail. The vector memory 54 suitably comprises a set of four dual-port, 32×64K video RAMS (VRAMS) 100–103. VRAMS are commonly used to store data defining attributes of pixels in pixel-based display systems. VRAMS permit pixel data to be randomly accessed word-by-word so that display attributes of individual pixels may be independently altered, and also permit sequentially stored data words to be accessed serially at high speed so as to permit rapid update of displays. The transputer 32 views the vector memory 54 as a single bank of 256K 32-bit words and accesses each VRAM by way of the local bus 46 through which it is able to read or write a single 32-bit data word from or to any address in the vector memory. Each VRAM 100–103 includes an additional port comprising an internal shift register which can transfer a 1024 byte vector between the VRAM and the vector processor 52 at high speed in serial form. The vector processor 52 views the vector memory 54 as two banks of vectors: a bank A (i.e. VRAM 100) containing 256 vectors and a bank B (i.e. VRAMS 101–103 in combination) containing 768 vectors. Vector elements may be either 32 or 64 bits long and with 32-bit vector elements, the vectors are 256 elements long, while with 64-bit vector elements the vectors are 128 elements long.

The vector processor 52 comprises a pair of floating point multipliers 110 and 112, each capable of multiplying two 32 or 64-bit serial data words supplied to X and Y inputs to produce a 32 or 64-bit serial word at its R output. Vector processor 52 also includes an arithmetic logic unit (ALU) 114, capable of summing or subtracting two 32 or 64-bit serial data words supplied to its X and Y inputs to produce a 32 or 64-bit output R. ALU 114 is further capable of producing an output which is the absolute value of its X or Y input.

A set of multiplexers 116–119 is provided to connect the serial outputs of VRAMS 100–103 to inputs of multipliers 110, 112 and ALU 114. Multiplexer 116 selectively connects either the serial port output of VRAM bank A (i.e. VRAM 100) or the R output of ALU 114 to the Y input of ALU 114. Multiplexer 117 supplies either the serial port output of VRAM bank B (i.e., one of the parallel connected serial port outputs of VRAMS 101–103) or an R output of multipliers 110 and 112 to the X input of ALU 114. Multiplexer 118 connects either the serial port output of VRAM bank A or the R output of ALU 114 to the Y inputs of multipliers 110 and 112, while multiplexer 119 selectively connects either the serial port output of VRAM bank B or the R outputs of multipliers 110 and 112 to the X inputs multipliers 110 and 112. A multiplexer 121 is provided to connect either the R outputs of multipliers 110 add 112 or the R output of ALU 114 to the serial port inputs of VRAMS 100–103.

Vector processor 52 additionally includes a synchronous state machine 120, employed for programming, which controls the serial port input and output access to VRAMS 100–103, switching of multiplexers 116–119 and 121, and operation of multipliers 110 and 112 and ALU 114. The state machine 120, clocked by a system clock signal, is itself programmed by data conveyed from transputer 32 via local bus 46 when enabled by an enable signal (E) produced by decoder 124. Decoder 124 decodes an address which is placed on local bus 46 together with the state machine 120 programming data, the address being latched into decoder 124 by latch 122. Inputs to state machine 120, for initiating state changes, include status signals (SI) produced by multipliers 110, 112 and ALU 114, the status signals indicating when input data has been received, when arithmetic operations are completed and when output data is transmitted.

State machine 120 generates an interrupt signal (I) transmitted to transputer 32, indicating to the transputer that the vector processor 52 has completed a vector operation on data in the shift registers of VRAM banks 100–103. Transputer 32 then utilizes local bus 46 to address banks 100–103 such that new data is loaded into their shift registers and then transmits a command to state machine 120 to initiate a next vector operation. A reset input (R) of state machine 120 causes the state machine to halt current operation and to wait for reprogramming data from transputer 32. Decoder 124 further produces an enable signal permitting a second decoder 126 to decode data on local bus 46, the data indicating which link 50 is to be connected to transputer 32 and the direction in which data is to be transmitted on the link. The decoder 126 controls switching of multiplexers 48 according to the value of the decoded data. An externally generated reset signal, along with an externally generated "boot" signal, are also applied as inputs to transputer 32. These signals are used during system startup to initiate programming of transputer 32 as described in more detail hereinbelow. Although a preferred form of vector processor 52 is shown and described, other forms of vector or array processors comprising fast, multi-bus arithmetic units may also be employed.

Figure 8:
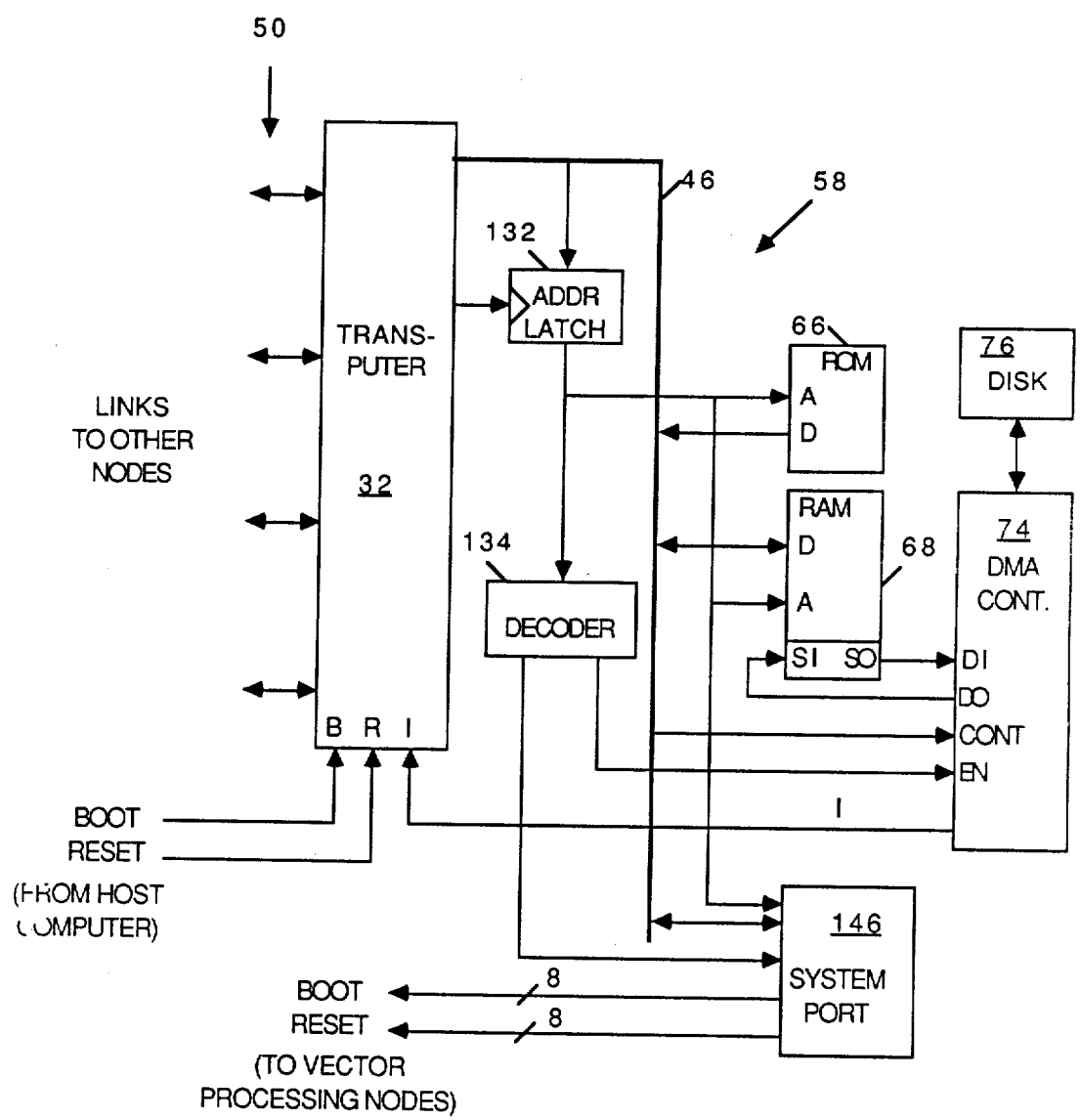
FIG. 8 is a detailed block diagram of a system node in accordance with the present invention.

FIG. 8 depicts the system node of FIG. 6 with portions other than the transputer 32 being shown in more detailed block diagram form. Address lines of the local bus 46, controlled by transputer 32, are latched by latch 132, and the output thereof is decoded by a decoder 134. The data lines of local bus 46, and the latched local bus address, are applied to data and address terminals of ROM 66, RAM 68, and system port 146. ROM 66 provides program instructions for operation of transputer 32 during system startup, as described in more detail hereinbelow. RAM 68 is a video RAM having an additional port (SI/SO) for high speed input and output of blocks of data in serial form. This serial port is connected to a direct memory access controller 74 adapted to control transfer of data between RAM 68 and hard disk drive 76. Operation of DMA controller 74 is directed by control data provided by transputer 32 via local bus 46, such data being acquired by DMA controller 74 on receipt of an enable signal (EN) produced by decoder 134 on detection of an appropriate address output of latch 132. When the DMA controller 74 has completed a requested data transfer between the disk 76 and RAM 68, it transmits an interrupt signal (I) to transputer 32.

System port 146 generates a pair of signals "boot" and "reset" for each of up to eight vector or peripheral processing nodes controlled by the system node, the boot and reset signals being utilized during system start up. Each transputer in the system has a boot and a reset signal input. The reset signal tells the transputer that it is to acquire new program instructions and store them in its internal RAM 36. The state of the boot signal at the moment the reset signal is asserted indicates the source of the instructions. If the boot signal is of a first state when the reset signal is asserted, the transputer obtains booting instructions from a particular set of addresses on the local bus. If the boot signal is of a second state when the reset signal is asserted, the transputer obtains the instructions from a particular one of the incoming links.

The boot and reset input signals for the transputer 32 of each system node 58 are generated by an external host computer. On system start up, the host computer asserts the reset signal and sets the boot signal state to indicate to the system node transputer 32 that it should obtain boot instructions from ROM 66 via local bus 46. Once the system transputer has been booted, the host computer tells the system transputer to boot the transputers in the vector or peripheral processing nodes that it accesses. To boot a vector processing node transputer, the associated system node 58 causes its system port 146 to transmit boot and reset signals to the vector processing node transputer telling it to acquire boot instructions via the particular link interconnecting the system node and the vector processing node. The system node transputer acquires the boot instructions from disk 76 via DMA controller 74, RAM 68 and local bus 46, and transmits them to the vector processing node where they are stored in the main RAM accessed by the local transputer.

The topology of each peripheral processing node is similar to the topology of each system node 58 as shown in FIG. 8, except that peripheral processing nodes do not have system ports but do have a set of four multiplexers similar to multiplexers 48 of the vector processing node of FIG. 7 so that the transputer 32 of each peripheral processing node has access to the links. To boot a peripheral processing node, the associated system node transputer 32 causes the system port 146 to transmit a boot and a reset signal to the transputer in the peripheral processing node and informs that transputer to obtain boot instructions from the ROM 66 connected to the local bus 46 in the peripheral processing node.

Once the system, vector processing, and peripheral processing nodes have been booted, the host computer or computers may transmit further instructions and input data to the system nodes for forwarding to associated vector processing and peripheral processing nodes. The boot and reset signals can also be utilized to stop operation of the vector and peripheral processing nodes and reset them to prior states of operation following a system error, the prior states being restored utilizing data contained in the hard disk drives in the system nodes to reload memories in the vector and peripheral processing nodes.

It should be mentioned that except for the devices connected to the local bus, the system, vector, and peripheral processing nodes may be identical. This homogeneity in the vector processing computer of the present invention permits it to be easily expanded by adding new vector or peripheral processing nodes, without physically modifying nodes. Furthermore, since each node may be linked to as many as sixteen other nodes, a wide variety of configurations are possible.

There has been shown and described, a massively parallel vector computer comprising a set of vector processing nodes, each including a main processor and a main RAM connected to an internal bus, and each including a vector memory and a programmable vector processor connected to a local bus, the local and internal busses communicating via a local interface port. External interface ports on the internal bus of each node link pairs of nodes to form a vector processing network in which data may be transferred from any one node to any other node via interconnecting nodes and links. The topology of the vector processing nodes permits the vector processor of each node to carry out vector operations at the same time the node is engaged in communicating with another node, or at the same time the main processor in the node is carrying out computations or operations involving access to the main RAM. Therefore, even though a vector processing node may, for example, be assisting in data transfer between two other nodes in the network, the data transfer does not substantially affect the rate at which the vector processing node carries out its vector operations.

In addition, the vector computer further comprises peripheral processing nodes, each node providing read and write access to secondary memory. External bus interface ports of each peripheral processing node link the node to other peripheral processing nodes to form a peripheral processing network in which data may be transferred from any one peripheral processing node to any other node via interconnecting peripheral processing nodes and links. External bus interface ports of one or more of the peripheral processing nodes are interconnected by links to vector processing nodes in the vector processing network such that each vector processing node in the vector processing network may communicate with any one of the peripheral processing nodes in the peripheral processing network via intermediate links and nodes.

Since the peripheral processing nodes are interconnected into a peripheral processing network including only peripheral processing nodes, data may be transferred between the secondary storage devices of any two peripheral processing nodes without passing through vector processing nodes. Thus, although any vector processing node can communicate with any peripheral processing node via internetwork links, large blocks of data such as vectors or groups of vectors may be transferred between peripheral processing nodes without interfering with the data transfer and vector processing operations carried out by the vector processors.

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:

1. A vector processing node for a computer of the type having a network of simultaneously operating vector processing nodes interconnected by bidirectional external busses for conveying parallel data words between said vector processing nodes, the vector processing node comprising:

a bi-directional first bus for conveying parallel data words;

a bi-directional second bus for conveying parallel data words;

vector memory means connected for read and write access through said second bus for storing vectors comprising sequences of parallel data words conveyed on said second bus;

vector processing means connected to said second bus for transmitting parallel data words to and receiving parallel data words from said vector memory means for generating output vectors comprising functions of input vectors stored in said vector memory means and for storing said output vectors in said vector memory means; and control means including a computer processor connected to said first bus, external port means controlled by said computer processor and connected between said first bus and said external busses, and local port means controlled by said computer processor connected between said first and second busses, for transmitting parallel data words to and receiving parallel data words from said first bus, said second bus, said external busses, and said vector memory means for selectively transferring parallel data words from a selected one of said external busses to said first bus, from said first bus to a selected one of said external busses, between said first bus and said second bus, and between said second bus and said vector memory means.

2. A vector processing node for a computer of the type having a plurality of concurrently operating vector processing nodes interconnected by bi-directional external busses for conveying parallel data words between said vector processing nodes, the vector processing node comprising:

a bi-directional first bus for conveying parallel data words;

a bi-directional second bus for conveying parallel data words;

vector memory means connected for read and write access through said second bus for transmitting parallel data words to and receiving parallel data words from said second bus for storing vectors comprising sequences of data words;

data memory means connected to said first bus for transmitting parallel data words to and receiving parallel data words from said first bus for storing data words;

vector processing means connected to said second bus for transmitting parallel data words to and receiving parallel data words from said vector memory means for generating output vectors comprising functions of input vectors stored in said vector memory means and for storing said output vectors in said vector memory means; and control means including a computer processor connected to said first bus, external port means controlled by said computer processor and connected between said first bus and said external busses, and local port means controlled by said computer processor connected between said first and second busses, for transmitting parallel data words to and receiving parallel data words from said first bus, said second bus, a plurality of said external busses, said data memory means, and said vector memory means for selectively transferring parallel data words from a selected one of said plurality of external busses to said first bus, from said first bus to a selected one of said plurality of external busses, between said first bus and said data memory means, between said first bus and said second bus, and between said second bus and said vector memory means.

3. The vector processing node according to claim 2 wherein said vector memory means comprises a random access memory for storing data words at a plurality of addressable storage locations, said random access memory having a first port for providing said second bus with read and write access to any selected addressable storage location in said random access memory, and a second port for permitting said vector processing means to access a selected plurality of addressable storage locations in said random access memory.

4. The vector processing node according to claim 3 wherein said second port comprises means for transmitting data words to and receiving data words from said vector processing means in serial form.

5. A computer comprising:

a plurality of bi-directional external busses for conveying parallel data words; and a plurality of vector processing nodes interconnected by said plurality of external busses, each node comprising means for processing parallel data words and for selectively transmitting and receiving parallel data words on at least one of said plurality of external busses, at least one of said nodes comprising:

a bi-directional first bus for conveying parallel data words, a bi-directional second bus for conveying parallel data words, vector memory means connected for transmitting parallel data words to and receiving parallel data words from said second bus for storing vectors comprising sequences of data words, vector processing means connected for transmitting parallel data words to and receiving parallel data words from said vector memory means for generating output vectors comprising functions of input vectors stored in said vector memory means and for storing said output vectors in said vector memory means, and control means including a computer processor connected to said first bus, external port means controlled by said computer processor and connected between said first bus and said external busses, and local port means controlled by said computer processor connected between said first and second busses, for transmitting parallel data words to and receiving parallel data words from said first bus, said second bus, a plurality of said external busses and said vector memory means for selectively transferring parallel data words from a selected one of said external busses to said first bus, from said first bus to a selected one of said external busses, between said first bus and said second bus, and between said second bus and said vector memory means.

6. A computer comprising:

a plurality of bi-directional external busses for conveying parallel data words; and a plurality of vector processing nodes interconnected by said external busses, each node comprising means for processing parallel data words and for selectively transmitting and receiving parallel data words on at least one of said plurality of external busses, at least one of said nodes comprising:

a bi-directional first bus for conveying parallel data words, a bi-directional second bus for conveying parallel data words, vector memory means connected for transmitting parallel data words to and receiving parallel data words from said second bus for storing vectors comprising sequences of data words, data memory means connected for transmitting parallel data words to and receiving parallel data words from said first bus for storing parallel data words, vector processing means connected for transmitting parallel data words to and receiving parallel data words from said vector memory means for generating output vectors comprising functions of input vectors stored in said vector memory means and for storing said output vectors in said vector memory means, and control means including a computer processor connected to said first bus, external port means controlled by said computer processor and connected between said first bus and said external busses, and local port means controlled by said computer processor connected between said first and second busses, for transmitting parallel data words to and receiving parallel data words from said first bus, said second bus, a plurality of said external busses, said data memory means, and said vector memory means for selectively transferring parallel data words from a selected one of said plurality of external busses to said first bus, from said first bus to a selected one of said plurality of said external busses, between said first bus and said data memory means, between said first bus and said second bus, and between said second bus and said vector memory means.

7. The computer according to claim 6 wherein said vector memory means comprises:

a random access memory for storing parallel data words at a plurality of addressable storage locations, said random access memory having a first port connected for transmitting parallel data words to and receiving parallel data words from said second bus for providing said control means with read and write access to any selected addressable storage location in said random access memory, and a second port connected for transmitting data words to and receiving data words from said vector processing means for providing said vector processing means with read and write access to a selected plurality of addressable storage locations in said random access memory.

8. The computer according to claim 7 wherein said second port comprises means for transmitting data words to and receiving data words from said vector processing means in serial form.

9. A peripheral processing node for a computer of the type including a plurality of simultaneously operating peripheral processing nodes interconnected by bidirectional external busses for conveying parallel data words between said peripheral processing nodes, each peripheral processing node providing for data transfer between a peripheral data storage device and one of said external busses, the peripheral processing node comprising:

a bi-directional first bus for conveying parallel data words;

a bi-directional second bus for conveying parallel data words;

memory means connected to the second bus for transmitting parallel data words to and receiving parallel data words from said second bus for storing parallel data words;

a direct memory access controller connected to said second bus for transmitting parallel data words to and receiving parallel data words from said memory means for providing a peripheral device with read and write access to said memory means; and control means including a computer processor connected to said first bus, external port means controlled by said computer processor and connected between said first bus and said external busses, and local port means connected between said first and second busses, for transmitting parallel data words to and receiving parallel data words from a plurality of said external busses, said first and second bus, and said memory means for selectively transferring parallel data words from a selected one of said plurality of external busses to said first bus, from said first bus to a selected one of said plurality of external busses, between said first bus and said second bus, and between said second bus and said memory means.

10. A computer comprising:

a data processing network comprising a plurality of vector processing nodes and a plurality of bi-directional first external busses interconnecting pairs of said vector processing nodes, each vector processing node comprising means for processing parallel data words and for selectively transmitting and receiving parallel data words on first external busses to which it is connected;

a plurality of peripheral devices for storing, transmitting and receiving parallel data words;

a peripheral processing network comprising a plurality of peripheral processing nodes and a plurality of bi-directional second external busses interconnecting pairs of said peripheral processing nodes, each peripheral processing node comprising means for transmitting parallel data words to and receiving parallel data words from a second peripheral device and for selectively transmitting and receiving parallel data words on second external busses to which it is connected; and a bi-directional third external bus interconnecting at least one of said vector processing nodes to at least one of said peripheral processing nodes, said one vector processing node and said one peripheral processing node further comprising means for selectively transmitting and receiving parallel data words on said third external bus, wherein at least one of said vector processing nodes comprises:

a bi-directional fourth processing bus for conveying parallel data words;

a bi-directional fifth processing bus for conveying parallel data words;

a vector memory connected for transmitting parallel data words to and receiving parallel data words from said fifth processing bus for storing vectors comprising sequences of parallel data words;

first data memory means for storing parallel data words;

vector processing means connected for transmitting parallel data words to and receiving parallel data words from said vector memory means for generating output vectors comprising functions of input vectors stored in said vector memory and for storing said output vectors in said vector memory; and control means including a computer processor connected to said fourth processing bus, external port means controlled by said computer processor and connected between said fourth processing bus and said first external busses, and local port means connected between said fourth and fifth busses, for transmitting parallel data words to and receiving parallel data words from said fourth processing bus and said fifth processing bus for selectively transferring parallel data words from a selected one of a plurality of said first external busses to said fourth processing bus, from said fourth processing bus to a selected one of said plurality of said first external busses, between said fourth processing bus and said first data memory means, between said fourth processing bus and said fifth processing bus, and between said fifth processing bus and said vector memory means.

11. The computer according to claim 10 wherein said vector memory means comprises a random access memory for storing data words at a plurality of addressable storage locations, said random access memory having a first port for providing said fifth processing bus with read and write access to any selected addressable storage location in said random access memory, and a second port for permitting said vector processing means to read and write access a selected plurality of addressable storage locations in said random access memory.

12. The computer according to claim 10 wherein at least one of said peripheral processing nodes comprises:
- a bi-directional sixth processing bus for conveying parallel data words;
- a bi-directional seventh processing bus for conveying parallel data words;
- second data memory means connected for transmitting parallel data words to and receiving parallel data words form said seventh processing bus for storing parallel data words conveyed on said seventh processing bus;
- a direct memory access controller connected for transmitting parallel data words to and receiving parallel data words from said second data memory means for providing a peripheral device with read and write access to said second data memory means; and
- control means including a computer processor connected to said sixth bus, external port means controlled by said computer processor and connected between said sixth bus and said second external busses, and local port means connected between said sixth and seventh busses, for transmitting parallel data words to and receiving parallel data words from said sixth and seventh processing busses, and to said second data memory means for selectively transferring parallel data from a selected one of said second external busses to said sixth processing bus, from said sixth processing bus to another selected one of said second external busses, between said sixth processing bus and said seventh processing bus, and between said seventh processing bus and said second data memory means.

13. A computer for processing data vectors and for transmitting parallel data words to and receiving parallel data words from a peripheral processing device, comprising:
- a bi-directional first bus for conveying parallel data words;
- a bi-directional second bus for conveying parallel data words;
- a bi-directional third peripheral bus for conveying parallel data words;
- a bi-directional fourth peripheral bus for conveying parallel data words;
- a bi-directional external bus for conveying parallel data words;
- vector memory means connected for transmitting parallel data words to and receiving parallel data words from said second bus for storing data vectors comprising sequences of parallel data words conveyed on said second bus;
- vector processing means connected for transmitting parallel data words to and receiving parallel data words from said vector memory means for generating output data vectors comprising functions of input data vectors stored in said vector memory means and for storing said output data vectors in said vector memory means;
- first control means for selectively transferring parallel data words between said external bus and said first bus, between said first bus and said second bus, and between said second bus and said vector memory means;
- data connected for transmitting parallel data words to and receiving parallel data words from said fourth bus for storing data words conveyed on said fourth bus;
- a direct memory access controller connected for transmitting parallel data words to and receiving parallel data words from said data memory means for providing a peripheral processing device with read and write access to said data memory means; and
- second control means for selectively transferring parallel data words between said external bus and said third peripheral bus, between said third bus and said fourth peripheral bus, and between said fourth peripheral bus and said data memory means.

* * * * *

UNITED STATES PATENT AND TRADEMARK OFFICE
CERTIFICATE OF CORRECTION

PATENT NO. : 4,891,751

DATED : January 2, 1990

INVENTOR(S) : DUANE B. CALL et al

It is certified that error appears in the above-identified patent and that said Letters Patent is hereby corrected as shown below:

Column 2, line 11, "nd" should be --and--.

Column 4, line 59, delete the comma.

Column 9, line 53, "add" should be --and--.

Column 12, line 53, "bidirectional" should be --bi-directional--.

Column 15, line 51, "bidirectional" should be --bi-directional--.

Column 16, line 35, "second" should be --said--.

Column 18, line 37, "data connected" should be --data memory means connected--.

Signed and Sealed this

Eighth Day of September, 1992

Attest:

DOUGLAS B. COMER

*Attesting Officer*  *Acting Commissioner of Patents and Trademarks*